United States Patent
Stentiford et al.

(10) Patent No.: US 8,085,881 B2
(45) Date of Patent: Dec. 27, 2011

(54) HIGH DATA RATE DEMODULATION SYSTEM

(75) Inventors: Frederick W M Stentiford, Suffolk (GB); Michael R Fitch, Suffolk (GB)

(73) Assignee: British Telecommunications public limited company, London (GB)

( * ) Notice: Subject to any disclaimer, the term of this patent is extended or adjusted under 35 U.S.C. 154(b) by 620 days.

(21) Appl. No.: 11/660,678

(22) PCT Filed: Aug. 5, 2005

(86) PCT No.: PCT/GB2005/003113
§ 371 (c)(1),
(2), (4) Date: Feb. 21, 2007

(87) PCT Pub. No.: WO2006/027543
PCT Pub. Date: Mar. 16, 2006

(65) Prior Publication Data
US 2007/0286317 A1    Dec. 13, 2007

(30) Foreign Application Priority Data

Sep. 8, 2004 (GB) .................................. 0419947.7

(51) Int. Cl.
*H04L 27/06* (2006.01)

(52) U.S. Cl. ....................................................... 375/340

(58) Field of Classification Search .................. 329/300, 329/304, 311; 375/238, 239, 242, 256, 257, 375/286, 340, 353
See application file for complete search history.

(56) References Cited

U.S. PATENT DOCUMENTS

| | | | |
|---|---|---|---|
| 3,747,065 A | 7/1973 | Gibson | |
| 4,439,863 A | 3/1984 | Bellamy | |
| 5,640,432 A * | 6/1997 | Wales | 375/346 |
| 5,671,257 A * | 9/1997 | Cochran et al. | 375/355 |
| 5,696,793 A | 12/1997 | Hashimura | |
| 5,832,038 A | 11/1998 | Carsello | |
| 6,324,382 B1 * | 11/2001 | Dolder | 455/63.1 |
| 6,456,646 B1 | 9/2002 | Asokan et al. | |
| 6,625,233 B1 | 9/2003 | Carsello | |
| 7,170,956 B1 * | 1/2007 | Fong et al. | 375/344 |
| 7,254,188 B2 * | 8/2007 | Cannon et al. | 375/324 |
| 2001/0034254 A1 | 10/2001 | Ranta | |

(Continued)

FOREIGN PATENT DOCUMENTS

EP    0 465 851 A2    1/1992

(Continued)

OTHER PUBLICATIONS

Fitch et al., U.S. Appl. No. 11/660,679, filed Feb. 21, 2007, entitled High Data Rate Demodulation System.

(Continued)

*Primary Examiner* — David C. Payne
*Assistant Examiner* — Erin File
(74) *Attorney, Agent, or Firm* — Nixon & Vanderhye P.C.

(57) ABSTRACT

The demodulation process of a wireless data transmission system using multi-level symbols makes use of templates corresponding to each of the possible symbol transitions, so that knowledge of previously decoded symbols can be used to decode the next one. An estimation and correction loop provides for initial estimation of the values of a plurality of consecutive symbols, and error estimates are made for the estimated initial values of the symbols and for one or more alternative values, a final estimate being determined to minimize the total estimated error.

8 Claims, 5 Drawing Sheets

U.S. PATENT DOCUMENTS

| | | | |
|---|---|---|---|
| 2002/0150184 A1* | 10/2002 | Hafeez et al. | 375/346 |
| 2003/0016773 A1* | 1/2003 | Atungsiri et al. | 375/355 |
| 2003/0091100 A1* | 5/2003 | El Nahas El Homsi et al. | 375/143 |
| 2003/0141938 A1* | 7/2003 | Poklemba et al. | 332/103 |
| 2005/0129147 A1* | 6/2005 | Cannon et al. | 375/324 |
| 2005/0238089 A1* | 10/2005 | Kodama et al. | 375/222 |
| 2006/0013186 A1* | 1/2006 | Agrawal et al. | 370/344 |
| 2009/0304120 A1* | 12/2009 | Agrawal et al. | 375/340 |

FOREIGN PATENT DOCUMENTS

| | | |
|---|---|---|
| EP | 1 047 069 A2 | 10/2000 |
| EP | 1 335 548 A1 | 8/2003 |
| JP | 60-022854 | 2/1985 |
| WO | WO 03/069867 A1 | 8/2003 |

OTHER PUBLICATIONS

International Search Report mailed Nov. 9, 2005 in International Application No. PCT/GB2005/003064.
UK Search Report mailed Jan. 28, 2005 in GB 0419947.7.
UK Search Report mailed Jan. 28, 2005 in GB 0419946.9.
International Search Report mailed Oct. 18, 2005 in International Application No. PCT/GB2005/003072.
Horikoshi et al., "Error Performance Improvement of Bandlimited QTFSK Assisted by an Efficient Coded Modulation and Viterbi Sequence Estimation," Proc. IEEE Vehicular Technology Conference, vol. 2, Jun. 1994, pp. 1006-1010.
Office Action mailed Mar. 29, 2010 in U.S. Appl. No. 11/660,679.
International Search Report mailed Nov. 9, 2005 in PCT/GB2005/003113.

* cited by examiner

HIGH DATA RATE DEMODULATION SYSTEM

This application is the US national phase of international application PCT/GB2005/003113 filed 5 Aug. 2005 which designated the U.S. and claims benefit of GB 0419947.7, dated 8 Sep. 2004, the entire content of which is hereby incorporated by reference.

BACKGROUND

1. Technical Field

This invention relates to a modulation system suitable for radio links, especially satellite links. Such links have limited power and bandwidth that puts a ceiling on the data throughput. Increasingly, bandwidth is the scarcer resource so that often there is a power margin. There is continuing effort in the modem industry to provide higher throughput over satellite links in order to lower the transmission costs. Developments include the use of 8PSK trellis coded modems.

2. Related Art

Satellite communications have been a very important part of the global telecommunications backbone for the past three decades. Satellite operators provide Internet Services Providers (ISPs) with long distance point-to-point (trunk) links to the Internet backbone. Currently, approximately 4% of satellite transponders are used for Internet trunking services. Although optical fibre connections are increasingly being used in the mature communications markets, satellite remains the only option (or at least the only cost-effective option) in other less developed or remote areas. Satellite communications have a number of specialist applications, notably news-gathering, military, emergency services.

Satellite news-gathering is becoming increasingly important with the popularity of TV news, particularly 'rolling news' channels such as CNN, Sky News and BBC News 24. The demand for the rapid transmission of up-to-date reports from international trouble spots has grown sharply. However, the quality of the broadcast images and sound are often poor because of the limited bandwidth caused by lack of capacity. Indeed, capacity is particularly likely to be limited in the very regions where newsworthy events such as major world conflicts or natural catastrophes occur, both because of disruption to the infrastructure and because of the needs of the military or emergency services. The ability of the proposed modulation scheme to increase capacity by a factor of two to three times would significantly enhance the quality of news broadcasts from remote regions.

There has been a huge increase in demand for bandwidth in the military sector, due to new strategies of 'network-centric warfare'. The fundamental principle of these strategies is to be able to conduct military operations with a numerically inferior force, by ensuring that all members of that force have a full and up-to-date picture of both the enemy and their own forces. The result of these strategies is that intelligence assets (mainly aircraft and special forces) are generating very large quantities of sensor data (especially imagery) that need to be rapidly transmitted to command and control systems and then to weapons systems. Typically, satellite communications met 70% of the total bandwidth requirements, with terrestrial wireless and optical fibre networks providing the rest. There is thus a very significant driver from the military for more efficient use of satellite transponder capacity.

Global demand for satellite Internet trunking is predicted to approximately double from 2005 to 2010. An improved modulation scheme would enable more efficient use of satellite transponders for this growing communications demand.

Given the high capital cost of satellite systems, there is significant incentive for service providers to use transponders very efficiently.

The present invention relates to improvements to frequency modulation (FM) schemes. International patent specification WO03/069867 describes a multi-level Gaussian frequency-shift keying (MGFSK) modulation scheme in which the impulse response extends over adjacent symbols. A block diagram of this system is shown in FIG. 1.

The modulator section 11-14 begins by mapping the incoming bits 10 to an alphabet of sixteen symbols (block 11), which equates to four bits per symbol. The sixteen symbols are represented by different amplitudes symmetrical about zero, e.g., −7.5, −6.5, −5.5 . . . −0.5, +0.5 . . . +5.5, +6.6, +7.5. These are multiplied by impulses of value 1 (block 12) to produce impulses of −7.5, −6.5 . . . +6.5, +7.5 at point 'x'.

These are applied to a Gaussian filter 13 to produce a set of impulses having a Gaussian shape, i.e. smooth waveforms with no negative or oscillatory characteristics, which are applied to a frequency modulator 14. This method of modulation is very similar to the scheme used by the GSM air interface, except that GSM uses only 2 levels (+/−1). The bandwidth of the Gaussian filter 13 is a critical parameter, if it is set smaller the occupied bandwidth is reduced but the intersymbol interference is increased since it sets the width (in time) of the impulse response. With this scheme, the product of bandwidth b and symbol period t, has been set at 0.35 as a reasonable trade-off. In comparison, the GSM mobile telephony standard uses a product bt=0.3.

The modulation index of the FM modulator is held at $\beta=1$, which according to Carson's rule means that the occupied bandwidth can be considered as $2*f_m$, where $f_m$ is the maximum frequency component of the modulating (baseband) signal which is set by the bandwidth of the Gaussian filter. Under this condition the occupied bandwidth BW can be calculated to be $$BW = \text{Symbol rate}*bt*2 = \text{Symbol rate}*0.7 \text{ (Hz)}$$

and the (uncoded) bandwidth efficiency E is E=4 (bits/symbol)/0.7=5.71 (bits/sec)/Hz. Since this is a narrow-band FM scheme it has a constant envelope, and is therefore suited to low-cost transmitters where the output amplifier can be saturated and also to satellite channels where the satellite transponder can be saturated. In this system the demodulator is based on look-up tables that train themselves according to the channel characteristics, which are determined by sending a unit impulse into the channel and measuring the response at the receivers. This system offers a significantly improved bandwidth efficiency compared to earlier 8PSK (8-level phase shift keying) systems, and is comparable to 64QAM. The use of 64QAM over satellite is not practical because to support it the channel would have to be highly linear and well equalised.

Typical parameters for MGFSK for a satellite application are the use of sixteen levels, giving 4 bits per symbol (because $16=2^4$), and partial response signaling, in which the symbols are formed by the impulse response of a low-pass Gaussian filter that stretches over adjacent symbols, similar to that in use with GSM. This enables a reduction in occupied bandwidth at the expense of some inter-symbol interference (ISI) and loss of orthogonality. The combination of multiple levels and partial response signaling results in a bandwidth efficiency of almost 6 (bits per sec)/Hz The filtered waveform is frequency modulated (block 14) onto a carrier 15 using a low modulation index ($\beta$) in order to keep the occupied bandwidth in the narrow-band class. Because it uses frequency modulation (FM) instead of the more common PSK, the signal is tolerant to equalization errors and non-linearities in RF amplifiers. These parameters are designed to maximize the bandwidth efficiency and, at the same time, maintain a constant envelope and the use of FM to maximize tolerance to non-linearities and equalization error.

A simulated 16-GFSK spectrum is shown in FIG. 2. In FIG. 2, the carrier frequency held low for the purposes of simulation at 2 kHz and the symbol rate is 10 baud. The 3 dB bandwidth (shown by the dotted horizontal line) of this spectrum is just 7 Hz. When scaled to 400 Mbit/s, the symbol rate is 100 Mbaud and the bandwidth would be 70 MHz.

As shown in FIG. 1, the demodulator 16-19 consists of an FM demodulator 16, filtering 17, a symbol detector 18, and a bit recovery processor 19. The filter 17 is designed to band-limit the noise but at the same time preserve a well-behaved impulse response, to ensure that it does not add significantly to the inter-symbol interference. The actual filtering implementation is performed in two stages at different sampling rates. The waveform at 'y' in FIG. 1 should be as close as possible to the waveform at the output of the Gaussian filter 13 in the modulator.

A simple detector 18 has been devised which makes use of look-up templates that store expected waveforms for every possible symbol transition (256 templates) and its operation is illustrated in FIG. 3. The input from the demodulator 16, 17 is read in (31) and compared (step 32) with templates which have been loaded previously (step 35). The symbol agreeing most accurately with the templates is selected (step 33) and generated as an output 36. The selection of the templates to be loaded (step 36) is made according to the output 36 for the previous symbol. Thus the number of templates to be compared is the same as the number of possible symbols "n", but the templates are selected from a larger corpus $n^2$ corresponding to all possible transitions between from symbol to the next.

In this prior art system it is relatively straightforward to allow for inter-symbol interference in the first half of the symbol because that half is more affected by previous symbols, which have already been determined and can be corrected for. However, it would be desirable to be able to use any part of the symbol, as there is no particular reason why the latter half should be any less prone to inter-symbol interference than the first half.

The entire set of templates can be built from the unit impulse response of the channel, since linearity can be assumed to hold with this scheme even though the channel is highly non-linear, because FM is used over the channel. The templates can be re-built at regular intervals if needed from the impulse response or from training sequences.

This scheme provides an increased bandwidth of two to three times that currently available commercially with quadrature amplitude modulation (QAM) schemes. The system provides best advantage when used in high bandwidth links that occupy the whole transponder. This provides a potential throughput of over 400 Mbits/s through a conventional 72 MHz transponder. The modulation system is particularly suited for point-to-point high-bandwidth services to large receiving antennas of 5 meters or more, for use in internet backbone connections, and in satellite news-gathering. It may also be suitable for smaller dish services such as television broadcast and provide a viable and better alternative to the traditional QAM schemes used, for example, in digital video broadcasting. The performance of a simulation of such a detector, which has a memory of one symbol, is plotted on FIG. 5, together with the theoretical plots for QPSK and 64-QAM for easy comparison. The error patterns are very different from those experienced with QAM schemes, in that when the symbol detector makes mistakes due to noise, the detected symbols are wrong only by +/−1 symbol and the errored symbols frequently appear in complementary pairs.

BRIEF SUMMARY

The present invention provides improvements to this system which provide more reliable detection in the presence of noise and interference.

According to the exemplary embodiments, there is provided a demodulation process for demodulating a signal comprising a series of symbols having more than two modulation states, in which the impulse responses of the individual symbols extend over adjacent symbols, the identification of each symbol being made by measuring its shape from samples taken along its length, wherein an estimation and correction loop provides for initial estimation of the values of a plurality of consecutive symbols, and error estimates are made for the estimated initial values of the symbols and for one or more alternative values, a final estimate being determined to minimize the total estimated error.

By varying an individual symbol value to be sub-optimal (perhaps only marginally so), the effect on the neighboring symbols may be such that their aggregate error is thereby reduced. It has been found that in practice, although there are potentially sixteen possible values for each symbol, most errors are of only one level (correct value=estimated value +/−1), so only adjacent levels need to be tested for in practice. Moreover, such errors tend to occur in complementary pairs, so in practice testing may be concentrated on sequences in which a correction to one symbol is balanced by an equal and opposite correction in the next following symbol.

In a preferred embodiment, the transition between each symbol and the subsequent symbol is compared with templates for the first estimate of the symbol value and for the values closest to the first estimate of the symbol value.

The invention also extends to a receiver having means to perform the demodulation process of the invention on a suitable signal of the type specified.

An embodiment of the invention will now be described, by way of example, with reference to the figures. This embodiment also incorporates the inventions of the applicant's co-pending applications filed on the same date as the present application and having applicant's references A30536 and A30542.

DETAILED DESCRIPTION OF EXEMPLARY EMBODIMENTS

Figure 1:
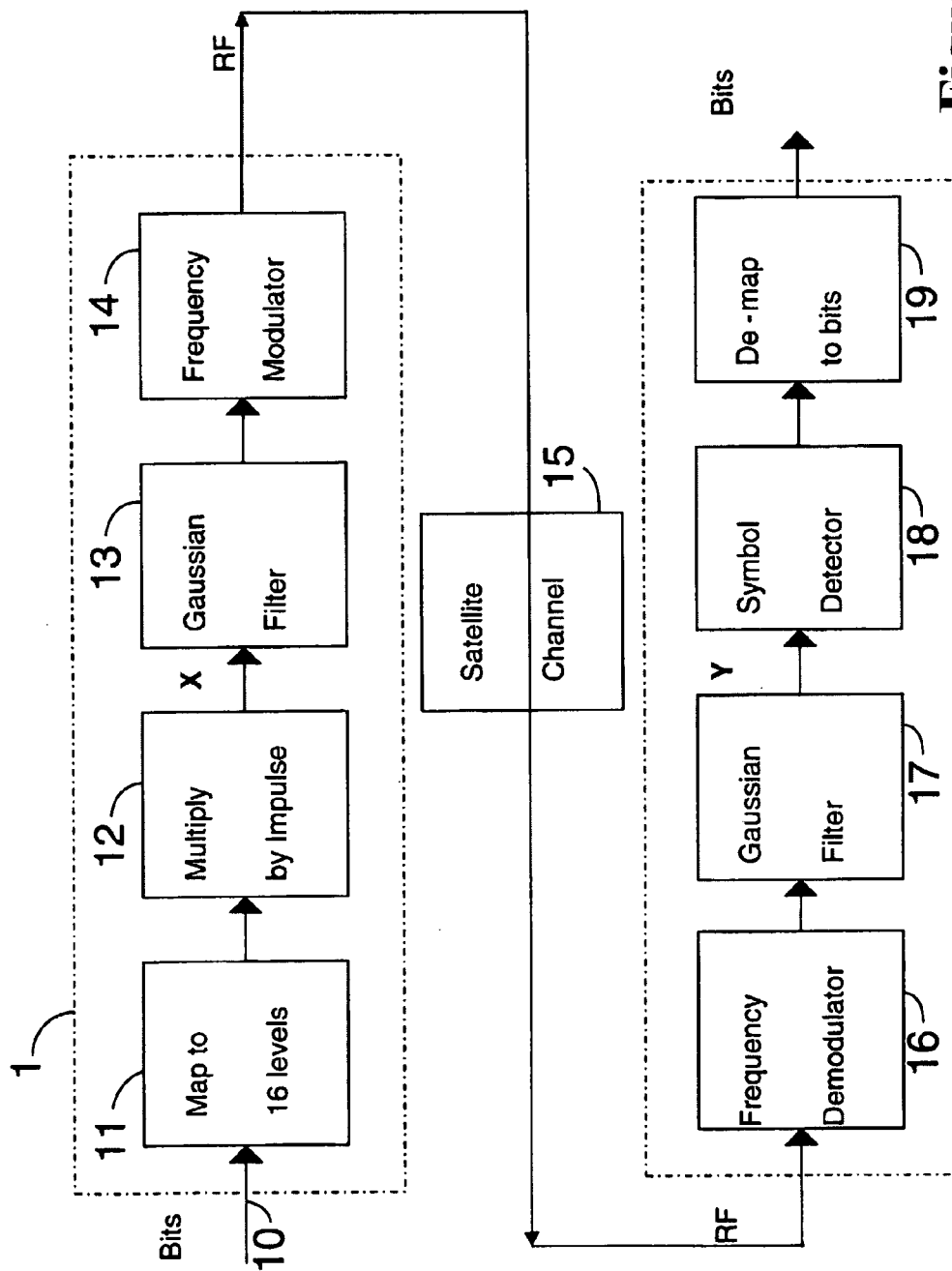
FIG. 1 is a block diagram of an MGFSK system, and has already been discussed with reference to the prior art.
Figure 2:
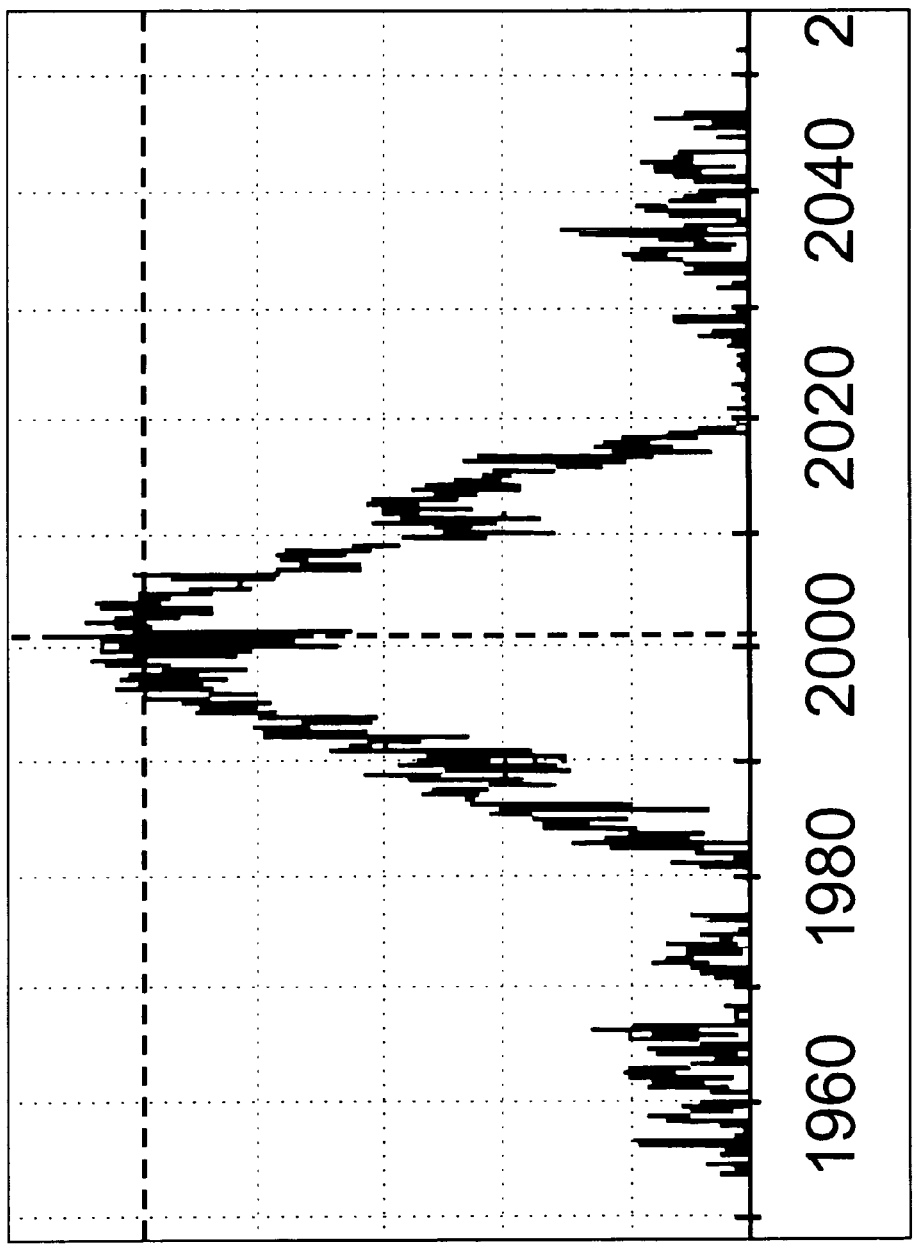
FIG. 2 is an illustration of a 16-GFSK simulated spectrum.
Figure 3:
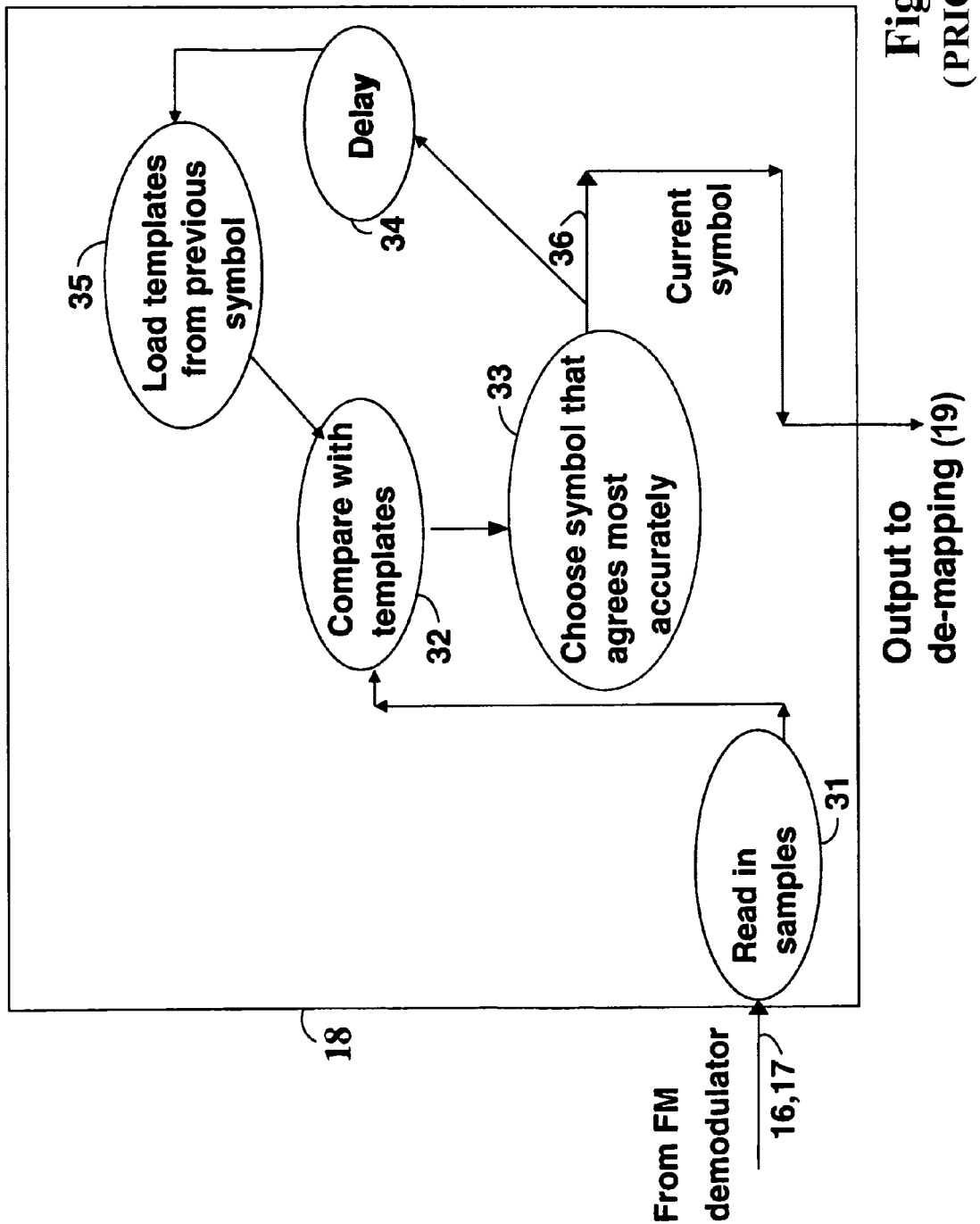
FIG. 3 is a block diagram of the detector element of FIG. 1.
Figure 4:
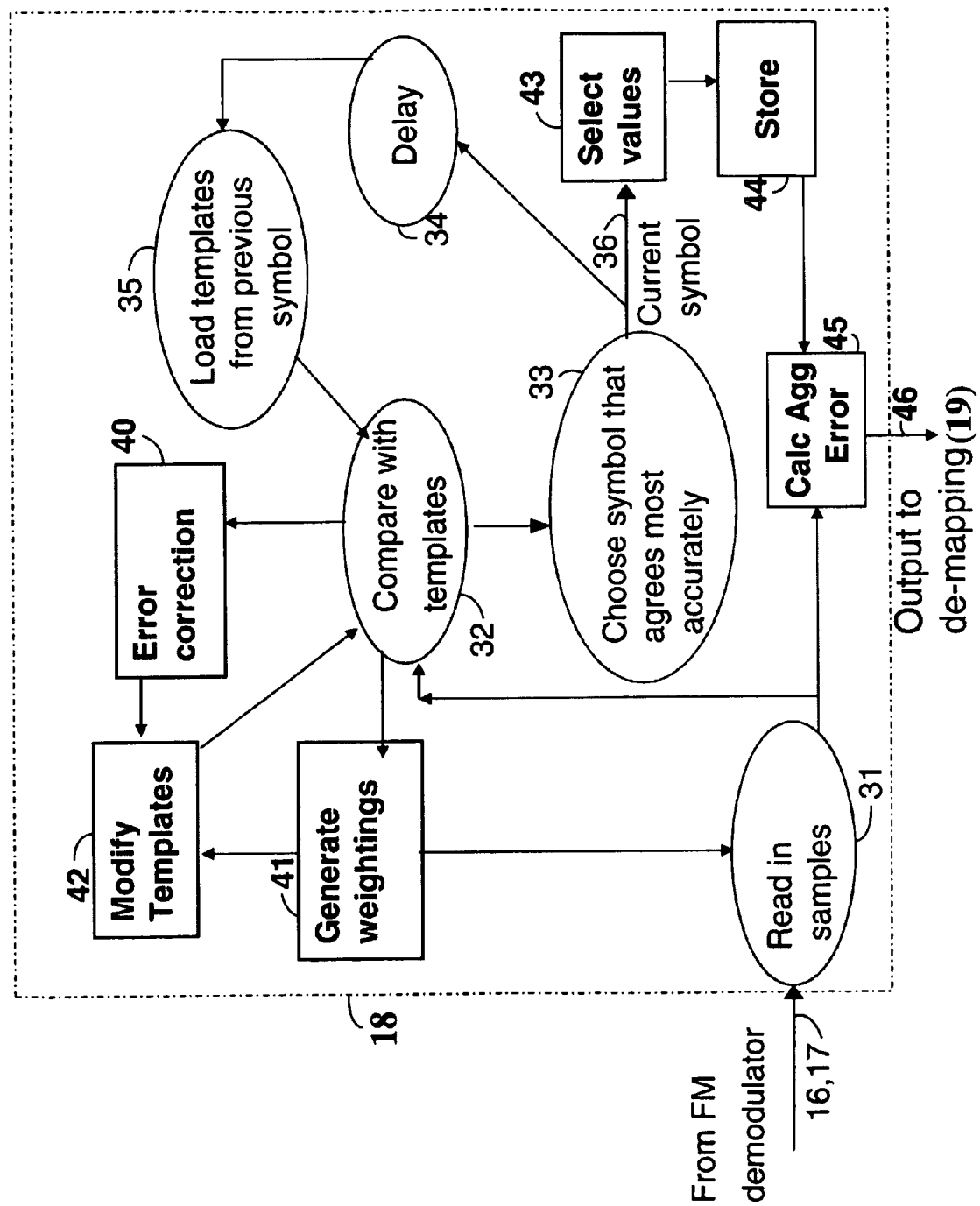
FIG. 4 is a block diagram of a modified detector incorporating an exemplary embodiment of the invention.

Referring to FIG. 4, in which elements common with FIG. 3 have the same reference numerals, the comparison function 32 generates an additional output representative of the difference between the selected template and the samples that were actually received from the reader 31. This output is supplied to an error correction processor 40 which, over a plurality of samples, generates an error correction algorithm, which is used to modify the templates 42 for application to subsequent samples. In this way the stored templates tend over time to form a closer match to the actual received samples, improving the reliability of the process.

The errors that occur are typically characteristic of the channel over which the symbols are transmitted, such as multipath interference caused by objects close to the receiver, co-channel interference from other transmitters, atmospheric effects, and other factors. The error correction process allows the detector to compensate for these effects, and adapt to changes in them.

The error correction algorithm operates on a relatively large sample, to minimize the effect of spurious error values derived from the small number of individual symbols that may have been wrongly identified. Thus, the symbol estimation process not only determines the most likely symbol to have been transmitted, but also measures the effects of interference on the shape of that symbol and corrects for it in estimates of subsequent symbols.

The error correction process 40 takes into account the degree of certainty in the estimation of each given symbol. Thus if the comparator 32 identifies an incoming symbol to have a 99% probability of taking value "A", the symbol selected will be "A", and the (small) difference between the sampled symbol and the template for symbol "A" will be used in the error correction process to better identify future examples of symbol "A". However, the comparator 32 may identify an incoming symbol to have only a 40% probability of taking value "A", (two other candidates having 35% and 25% probabilities). In this case the (large) difference between the sampled symbol and the template for symbol "A" would be given little weight in the error correction process because of the uncertainty as to which symbol it actually represents. However, the symbol selection process 33 must nevertheless select a symbol, and selects "A" as marginally more likely than the other candidates.

The comparison processor 32 also generates an output identifying which parts of the symbols generate samples most distinctive of individual symbol values, and which generate outputs which are less distinctive. Where these parts occur will depend on a number of factors: if the detected symbols are all symmetrical in the time domain the interference effect of an individual previous or subsequent symbol will generally be least towards the midpoint of the symbol. However, if there is a significant degree of interference between the symbols either side of the subject symbol, the midpoint of the subject symbol may be subject to more interference in aggregate because of the combined effect of its neighbors, making samples there less reliable (more ambiguous) than those some way to one side or the other. Other factors may include an asymmetrical impulse response, and the ability to allow for interference from previous symbols, which is a known quantity and, therefore, easier to allow for than interference from subsequent symbols that have themselves yet to be identified.

A weighting process 41 identifies the contribution each sample position is making to the symbol identification process 32, and generates control data to modify the symbol identification process 32 and the templates 42 by increasing the weighting of sampling points making a more significant contribution. Sampling points that do not distinguish clearly between different symbols can be given lower weightings. They may indeed be omitted altogether, (weighting adjusted to zero), allowing them to be replaced by sampling times selected from regions of the symbols that are identified as better capable of distinguishing between the symbols. Such changes require modification to the sample-reading process 31 as well as the templates.

Figure 5:
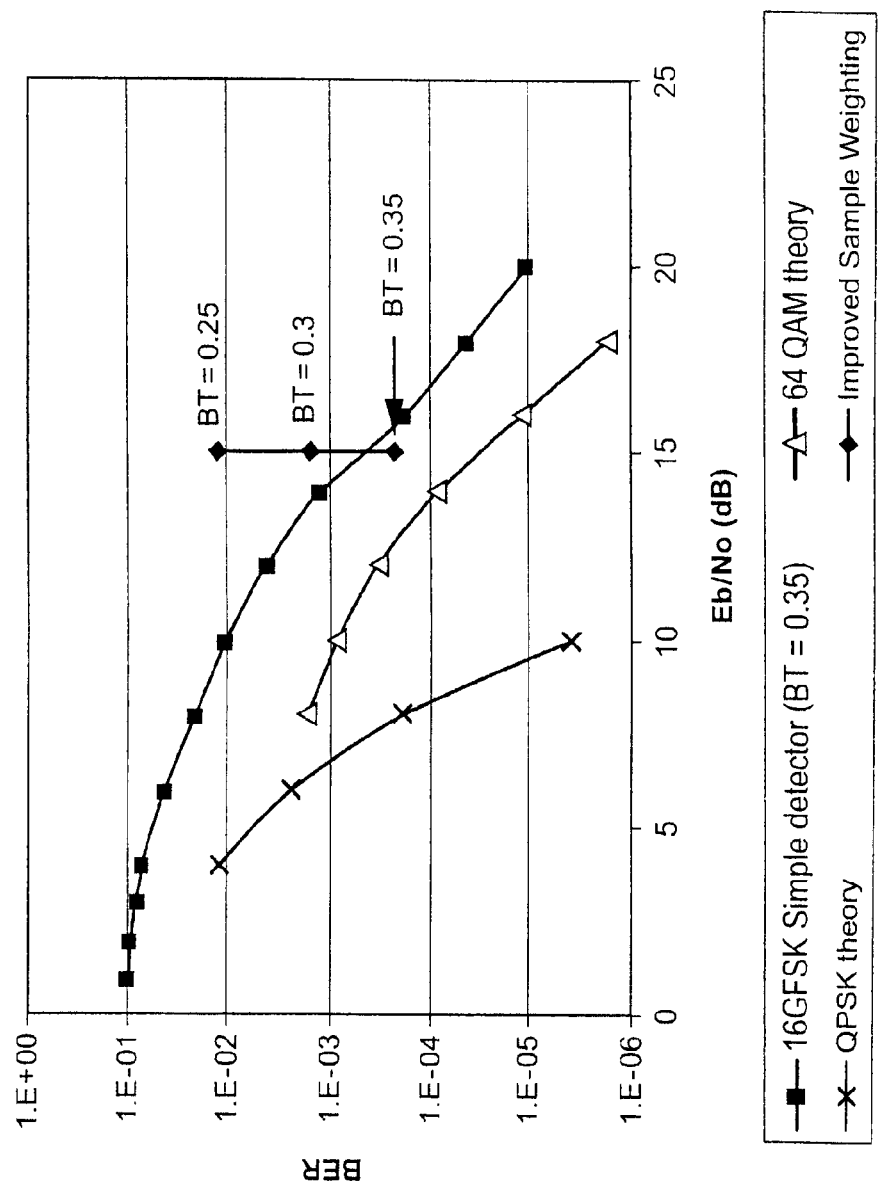
FIG. 5 illustrates how the performance of a detector in noise varies with optimization of the sampling weights.

Experiments have identified an improvement in symbol detection in the presence of noise from optimization of the sample weights by roughly 1 dB at bt=0.35. FIG. 5 shows the Bit Error Rate plotted against noise (uppermost curve) for a simple 16GFSK detector with the product of the bandwidth "b" and the symbol period "t" being 0.35. (The lower curves represent the theoretical values for 64QAM and QPSK.) The data points on the vertical line represent the values of BER for a 16GFSK system with optimized sample weighting in the presence of 15 dB of noise. It will be seen that with the same bandwidth-symbol period product of 0.35 used in the simple detector, noise performance is improved by about 1 dB (the same BER is achieved as for the simple detector at 16 dB). Alternatively, bandwidth can be saved by reducing the bandwidth-symbol period product bt to 0.3, at the price of a 1 dB degradation in noise performance.

The performance may be determined by comparison with predetermined test sequences transmitted over the communications link from time to time, or by analysis of the actual symbols used in the live transmission. The characteristics of interference vary from one channel to another, or over time in a single channel, so the process is preferably dynamic, adapting to the characteristics of the channel on which the signal is transmitted.

The preferred embodiment incorporates a forward error correction process comprising an estimation and correction loop 43-46. Since symbols carry some corruption from future symbols, which are unknown, a procedure is followed whereby an initial estimate is made of the symbol (say x). One or more subsequent symbols are then estimated, and a mathematical process is applied to the error magnitudes across one or more symbols, forward and/or backward in time, allowing the symbol x to be checked, and corrected if necessary. This provides for initial estimation of the values of a plurality of consecutive symbols using the estimation process 33.

For each symbol value output from the initial estimation process at 36, one or more alternative values are selected (43) and stored (44). The process is repeated for each symbol, and the aggregate error for a sequence of symbols is then determined (45) for various combinations of the stored candidate values. By varying an individual symbol value to be suboptimal (perhaps only marginally so), the effect on the neighboring symbols may be such that their aggregate error is thereby reduced. It has been found that in practice, although there are potentially sixteen possible values for each symbol, most errors are of only one level (initial estimate +/−1), so only adjacent levels need to be tested for in practice. Moreover, such errors tend to occur in complementary pairs, so in practice testing may be concentrated on sequences in which an error in one symbol is balanced by an equal and opposite error in the next following symbol. The sample sequence generating the lowest aggregate error is then selected, and the appropriate symbol or symbols are generated at the output 46.

This method exploits the fact that when the symbol detector makes a mistake due to noise, the estimated symbol is very commonly just one symbol either side of the correct symbol. The estimation-correction loop has been demonstrated in simulations to give an improvement in detection accuracy in noise.

In its simplest form, this process may operate on a sequence of just two symbols. An estimate of the first symbol is made (33) and stored (44), together with templates for the transitions from that symbol value to each of the sixteen possible values that the subsequent symbol (not yet sampled) may take. The two symbol values adjacent to the estimated value are identified (43). For each of these, the sixteen templates are selected representing the transitions from that symbol value to each of the sixteen possible values that the subsequent symbol may take. There are therefore a total of forty-eight templates to be stored (44). When the next sample is read in (31), each transition template is compared (step 45) with the samples representing the transition between the initial symbol and the newly arrived symbol, the best matching template thereby providing confirmation or modification of the initial estimate of the initial symbol value (output 46). This forward error correction requires a delay of one symbol period in order to allow comparison with the subsequent symbol.

The process may of course then be repeated, with the newly-sampled symbol in its turn compared with the next symbol to arrive at the reader 31 from the demodulator 16, 17.

In order to determine the ultimately achievable performance of the system, various parameters need to be optimized, subject to design and engineering constraints. Any coding/decoding scheme is optimized when:

parameters governing the coding procedure are adjusted to minimize the error rate for a given decoding procedure; and parameters governing the decoding procedure are adjusted to minimize the error rate for a given encoding procedure.

Ideally, one would perform a single optimization over both stages. For the second phase (optimal decoder design), two approaches may be considered. One may maintain a continuous model. This is computationally simpler, but does not model the real situation as accurately, because the solution is not a continuous function—the output has to be one of the discrete symbols, and not an intermediate value. Alternatively, one may consider all variables to be discrete (that is, effectively work at the digital level), which converts the problem into a very large linear programming (LP) problem. This is solvable in principle, although very complex (about 1 million linear programming variables). However, as computer hardware has developed, it is now becoming possible to use this approach.

What is claimed is:

1. A machine-implemented demodulation process for demodulating a signal comprising a series of symbols having more than two modulation states, in which the impulse responses of the individual symbols extend over adjacent symbols, said method comprising use of at least one programmed processor in a demodulator to effect:

identifying each symbol by measuring its shape from samples taken along its length, and using an estimation and correction loop to:

provide an initial estimation of the values of a sequence of consecutive symbols, make error estimates for the estimated initial values of the symbols, and for one or more alternative values, and determine a final estimate to minimize total estimated error in the sequence.

2. A demodulation process according to claim 1, in which the alternative values for which error estimates are made correspond to values adjacent to the estimated initial value.

3. A demodulation process according to claim 1, wherein signal sequences are such that a change in one symbol is balanced by an equal and opposite change in the next following symbol.

4. A demodulation process according to claim 1, in which a transition between each symbol and the subsequent symbol is compared with templates for the first estimate of the symbol value and for the values closest to the first estimate of the symbol value.

5. A receiver for receiving and demodulating a signal comprising a series of symbols having more than two modulation states, in which the impulse responses of the individual symbols extend over adjacent symbols, said receiver comprising:

a symbol detector in which the identification of each symbol is made by measuring its shape from samples taken along its length, an estimation and correction loop which utilizes:

means for making an initial estimation of the values of a sequence of consecutive symbols, error estimation means for determining error estimates for the estimated initial values of the symbols and for one or more alternative values, means for identifying the sequence of such values that minimizes total estimated error in the sequence, and means for outputting the sequence so identified.

6. A receiver according to claim 5, wherein the alternative values for which error estimates are made correspond to values adjacent to the estimated initial value.

7. A receiver according to claim 5, wherein signal sequences are such that a change in one symbol is balanced by an equal and opposite change in the next following symbol.

8. A receiver according to claim 5, further comprising means for comparing a transition between each symbol and the subsequent symbol with templates for the first estimate of the symbol value and for the values closest to the first estimate of the symbol value.

* * * * *